(12) United States Patent
Felton et al.

(10) Patent No.: US 7,852,781 B1
(45) Date of Patent: Dec. 14, 2010

(54) MANAGING COMMUNICATIONS SETTINGS

(75) Inventors: Mickey Steven Felton, Sterling, MA (US); Thomas Dibb, Rutland, MA (US); Dennis Mazur, Worcester, MA (US); Steven D. Sardella, Hudson, MA (US); Bernard Warnakulasooriya, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 1293 days.

(21) Appl. No.: 11/394,698

(22) Filed: Mar. 31, 2006

(51) Int. Cl.
*H04L 1/00* (2006.01)
*H04L 12/26* (2006.01)
*H04L 5/16* (2006.01)
*H04L 25/03* (2006.01)
*H04L 25/49* (2006.01)
*H03K 19/003* (2006.01)
*H03K 19/094* (2006.01)

(52) U.S. Cl. ........................ 370/252; 375/220; 375/296; 714/47; 326/27; 326/86

(58) Field of Classification Search ................. 370/252; 375/257, 296, 219–222; 714/47; 326/26, 326/27, 86
See application file for complete search history.

(56) References Cited

U.S. PATENT DOCUMENTS

| 6,636,922 | B1 * | 10/2003 | Bastiani et al. ............. 710/305 |
| 7,346,119 | B2 * | 3/2008 | Gorecki et al. .............. 375/268 |
| 2005/0281343 | A1 * | 12/2005 | Hsu et al. .................... 375/257 |
| 2006/0050723 | A1 * | 3/2006 | Yu .............................. 370/412 |

* cited by examiner

*Primary Examiner*—Ronald Abelson
(74) *Attorney, Agent, or Firm*—Krishnendu Gupta; Jason A. Reyes; Phillip W. Citroen (57) ABSTRACT

Communications settings are managed. System characteristics are determined that affect communications on a high speed transmission link between nodes. The system characteristics includes system hardware information and physical characteristics of a cable. Tuning information is derived from the system characteristics. At least some of the tuning information is communicated between the nodes.

18 Claims, 7 Drawing Sheets

| FRONT END | | | | | | |
|---|---|---|---|---|---|---|
| MEDIA | OPTICAL | | COPPER | | | |
| USER SPD | 1G,2G | 4G | 1,2G | 4G | 4G | 4G |
| SFP SPD | 4G | 4G | 2G/4G | 4G | 4G | 4G |
| LENGTH | ANY | ANY | ANY | 2m,5m | 8m | 3m |
| CONNECTOR | N/A | N/A | HSSDC1/2 | HSSDC2 | HSSDC2 | SFP |
| HW TYPE 1 | | | | | | |
| 2 | | | | | | |
| 3 | | | | | | |
| 4 | | | | | | |
| 5 | | | | | | |

FIG. 7A

| BACK END | | | | | | |
|---|---|---|---|---|---|---|
| MEDIA | OPTICAL | | COPPER | | | |
| USER SPD | 1,2G | 4G | 1,2G | 4G | 4G | 4G |
| SFP SPD | 4G | 4G | 2G/4G | 4G | 4G | 4G |
| LENGTH | ANY | ANY | ANY | 2m,5m | 8m | 3m |
| CONNECTOR | N/A | N/A | HSSDC1/2 | HSSDC2 | HSSDC2 | SFP |
| HW TYPE 1 | | | | | | |
| 2 | | | | | | |
| 3 | | | | | | |
| 4 | | | | | | |
| 5 | | | | | | |

FIG. 7B

MANAGING COMMUNICATIONS SETTINGS

FIELD OF THE INVENTION

The present invention relates to managing communications settings.

BACKGROUND OF THE INVENTION

Today's networked computing environments are used in businesses for generating and storing large amounts of critical data. The systems used for moving, storing, and manipulating this critical data are expected to have high performance, high capacity, and high reliability, while being reasonably priced.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre Channel employs a topology known as a "fabric" to establish connections between nodes. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre Channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

Fibre Channel data and other digital data are typically transmitted over various metallic transmission media, in the form of a series of square waves or pulses. Transmission of digital data therefore requires the use of a low-pass channel or cable with a bandwidth large enough to accommodate the essential frequency content of the data stream. High speed digital signals transmitted over cables or other transmission media may be severely distorted because the cable is not ideal and is dispersive in that each received pulse is affected by adjacent pulses, causing a phenomena called intersymbol interference. Intersymbol interference is a major source of bit errors in the reconstructed data stream at the receiver. To correct for intersymbol interference the pulse shape of the signal can be controlled in the overall system. There is a limit, however, to the data transmission rate and/or the distance over which signals may be transmitted because of intersymbol interference.

The data transmission rate for an information bearing signal on a transmission line is limited by data jitter, or the tendency of transitions to occur at different points during the respective signal periods.

The distance over which an information bearing signal may be transmitted on a transmission line is primarily limited by the phase distortion introduced by the transmission line. Progressive alteration of the pulse shape from the predetermined pulse shape for which a receiver is designed to operate may lead to transmission errors and limit the maximum range of the transmission.

Several prior art approaches attempt to alleviate the problems arising from distortion. One approach, known as receiver equalization, involves processing the received signal to make it more nearly correspond to the predetermined pulse shape.

A second prior art approach, referred to as predistortion or transmitter equalization, employs a separate mechanism at the output of the transmitter to alter the shape of the pulse introduced onto the transmission line. The predistortion is intended to be the inverse of the distortion resulting from inherent cable losses. This technique is suitable when the length and material of the transmission line is known so that the distortion can be estimated and a fixed predistortion factor can be preprogrammed.

The Fibre Channel protocol ("FCP") uses a single Open-Systems-Interface-like (OSI-like) stack architecture. Devices that are operable with the Fibre Channel protocol typically include a controller (an "FC controller") that embodies the functionality of some of the middle-layers of the FCP stack. Furthermore, FC controllers may involve a "controller chip". As part of the middle-layer FCP functionality, these FC controllers monitor the state of information transmissions over the FC communication links and are designed to take appropriate recovery measures should an unresponsive communication link be encountered.

Some FC controllers are included in integrated circuits that provide a serializer-deserializer (SERDES) function. SERDES circuits may also be referred to in the art as internal transmitter/receiver (iTR) circuits. SERDES circuits are generally incorporated into integrated circuits and operate at ultra high speeds (over two gigabits per second) and convert parallel data to serial data and serial data to parallel data. Modern day SERDES generally are capable of converting 10-bit or 20-bit parallel data into serial data and serial data to 10-bit or 20-bit parallel data. The interfacing requirements between a parallel data bus and a SERDES IC on a printed circuit board are implemented by a protocol controller device.

Fibre Channel links/ports can operate (i.e., receive and/or transmit data) in different speeds, for example, 1 gigabit per second ("G"), 2 G, 4 G, 8 G, and 10 G (the speeds actually specified by FC standards may be slightly different, e.g., 4 G is actually 4.25 gigabit per second). An FC controller needs to be configured and managed efficiently, especially with increasing throughput rates. If an FC link encounters too many errors within a defined period of time (e.g., more than one error every seven minutes), a loop initialization primitive (LIP) is initiated automatically, further reducing throughput. In at least some cases, an FC link will not tolerate a Bit Error Rate (BER) greater than one error every $10^{12}$ (ten to the twelfth power) bits. If FC controllers at the ends of an FC link do not match with respect to speeds and other settings including amplitude adjustment, equalization adjustment, and pre-emphasis level, the link may not work at all. Since the settings may depend on the length of a cable in the link, one solution is to restrict the use of cables to those with known and approved cable lengths. Alternatively, settings can be changed manually, e.g., using a graphical user interface, at both ends of the link in the event of a change in cable length.

SUMMARY OF THE INVENTION

Communications settings are managed. System characteristics are determined that affect communications on a high speed transmission link between nodes. The system characteristics includes system hardware information and physical characteristics of a cable. Tuning information is derived from the system characteristics. At least some of the tuning information is communicated between the nodes.

One or more embodiments of the invention may provide one or more of the following advantages.

A high speed communications link can be automatically tuned for high performance in response to hardware configuration changes. Tuning values for use with the link can be updated easily. Both sides of the link can be tuned together, automatically.

Other advantages and features will become apparent from the following description, including the drawings, and from the claims.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

In at least one implementation described in more detail below, system characteristics that affect communications on a high speed transmission link between nodes, including physical characteristics of a cable, are detected and resulting tuning information is communicated between the nodes. This allows transmitters and receivers at both ends of the link to be configured with preferred signal integrity settings prior to establishing steady state data transfer.

Figure 1:
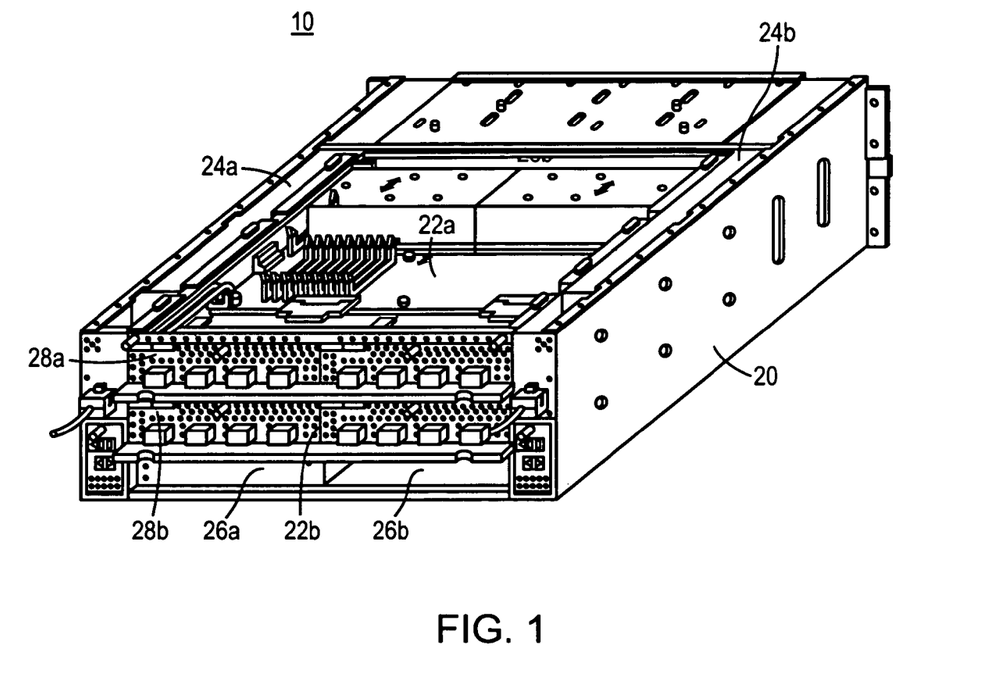
FIG. 1 is an isometric view of a storage system in which at least a portion of the invention may be implemented.

Referring to FIG. 1, there is shown a portion of a storage system 10 that is one of many types of systems in which the principles of the invention may be employed. The storage system 10 shown may operate stand-alone or may populate a rack including other similar systems. The storage system 10 may be one of several types of storage systems. For example, if the storage system 10 is part of a storage area network (SAN), it may be coupled to an enclosure of disk drives via a storage channel connection such as Fibre Channel. If the storage system 10 is, rather, a network attached storage system (NAS), it may be configured to serve file I/O over a network connection such as an Ethernet.

Figure 2:
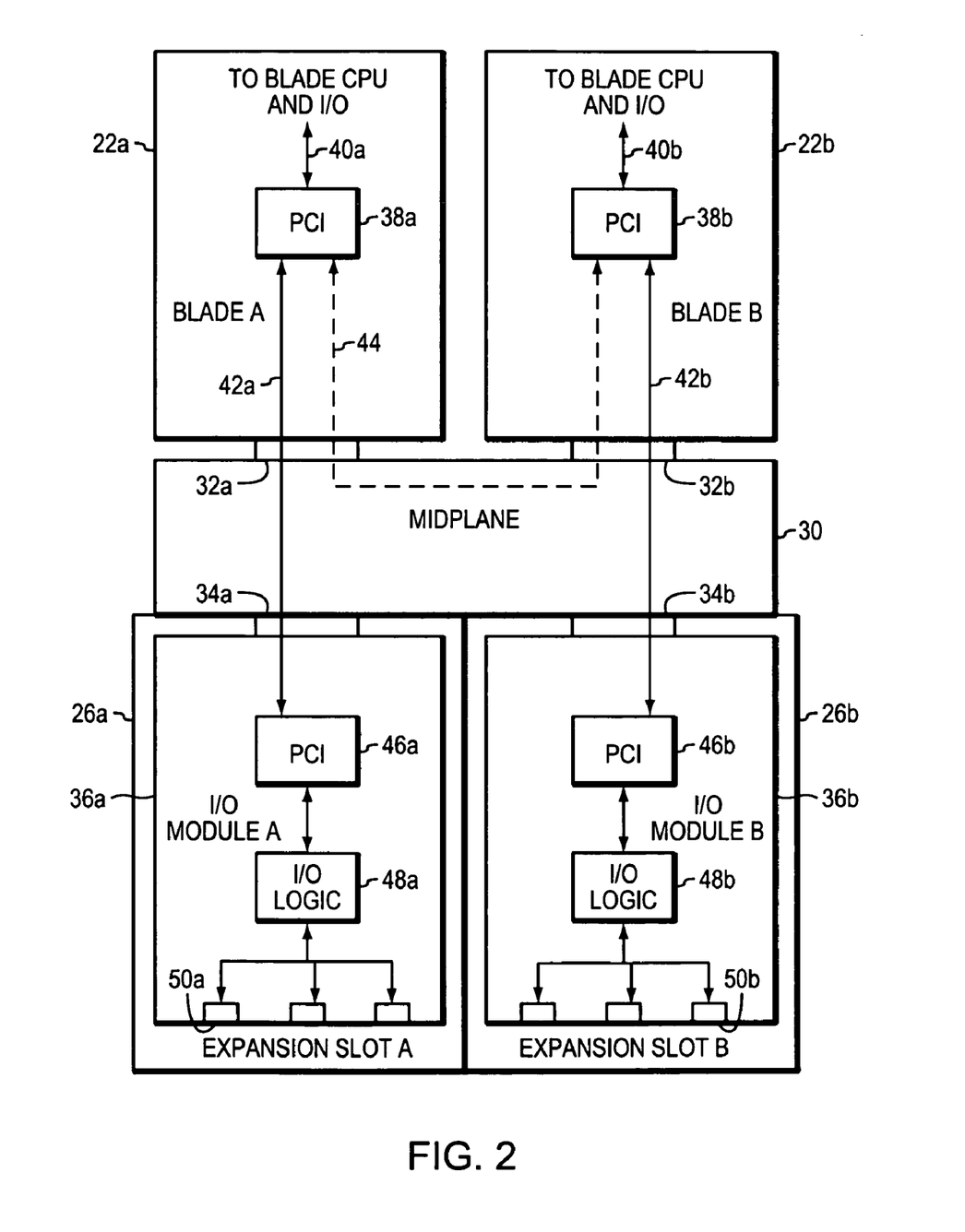
FIG. 2 is a schematic representation of a first configuration of the system of FIG. 1 showing a blades, two expansion slots, and two I/O modules installed in the expansion slots.

The storage system 10 includes within a chassis 20 a pair of blades 22a and 22b, dual power supplies 24a,b and dual expansion slots 26a,b. The blades 22a and 22b are positioned in slots 28a and 28b respectively. The blades 22a,b include CPUs, memory, controllers, I/O interfaces and other circuitry specific to the type of system implemented. The blades 22a and 22b are preferably redundant to provide fault tolerance and high availability. The dual expansion slots 26a,b are also shown positioned side by side and below the blades 22a and 22b respectively. The blades 22a,b and expansion slots 26a,b are coupled via a midplane 30 (FIG. 2). The expansion slots 26a,b can be used in several ways depending on system requirements.

In FIG. 2, the interconnection between modules in the expansion slots 26a,b and the blades 22a,b is shown schematically in accordance with a first configuration. Each blade 22a,b is coupled to the midplane 30 via connectors 32a,b. The expansion slots 26a,b are also shown coupled to the midplane 30 via connectors 34a,b. The blades 22a,b can thus communicate with modules installed in the expansion slots 26a,b across the midplane 30. In this configuration, two I/O modules 36a and 36b are shown installed within the expansion slots 26a and 26b respectively and thus communicate with the blades 22a,b separately via the midplane 30.

In accordance with a preferred embodiment, the blades 22a,b and I/O modules 36a,b communicate via buses, e.g., PCI Express buses. Each blade 22a,b includes a switch 38a,b that drives a bus 40a,b to and from blade CPU and I/O resources. The switches 38a,b split each bus 40a,b into two buses. One bus 42a,b is coupled to the corresponding expansion slot 26a,b. The other bus 44 is coupled to the other blade and is not used in this configuration—thus it is shown dotted. The I/O modules 36a,b may be PCI Express cards, including PCI Express controllers 46a,b coupled to the respective bus 42a,b. Each I/O module 36a,b includes I/O logic 48a,b coupled to the controller 46a,b for interfacing between the bus 42a,b and various interfaces 50a,b such as one or more Fibre Channel ports, one or more Ethernet ports, etc. depending on design requirements. Furthermore, by employing a standard bus interface such as PCI Express, off-the-shelf cards may be employed as needed to provide I/O functionality with fast time to market.

The configuration of FIG. 2 is particularly useful where the storage system 10 is used as a NAS. The NAS is I/O intensive; thus, the I/O cards provide the blades 22a,b with extra I/O capacity, for example in the form of gigabit Ethernet ports.

Figure 3:
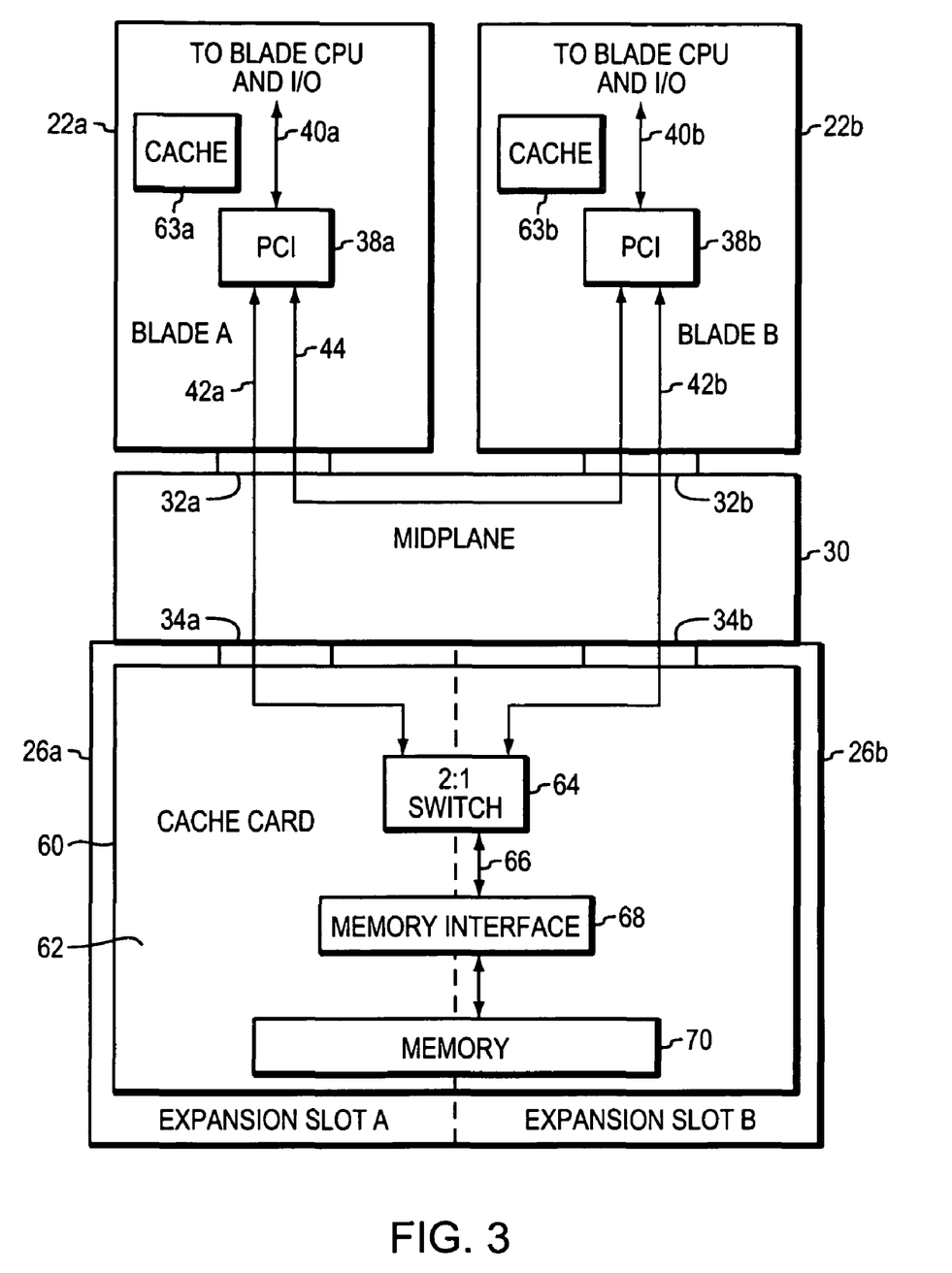
FIG. 3 is a schematic representation of a second configuration of the system of FIG. 1 showing the blades, two expansion slots, and one shared cache memory card installed in both the expansion slots.

Referring to FIG. 3, there is shown an alternate arrangement for use of the expansion slots 26a,b. In this arrangement, a single shared resource 60 is inserted in both the expansion slots 26a,b and is shared by the blades 22a,b. The shared resource 60 may be for example a cache card 62. The cache card 62 is particularly useful for purposes of high availability in a SAN arrangement. In a SAN arrangement using redundant blades 22a,b as shown, each blade includes cache memory 63a,b for caching writes to the disks. During normal operation, each blade's cache is mirrored in the other. The blades 22a,b mirror the data between the caches 63a,b by transferring it over the bus 44. If one of the blades, for example blade 22a, fails, the mirrored cache 63a becomes unavailable to the other blade 22b. In this case, the surviving blade 22b can access the cache card 62 via the bus 42b for caching writes, at least until the failed blade 22a recovers or is replaced.

As seen in FIG. 3, the cache card 62 may include a two-to-one PCI Express switch 64 coupled to the buses 42a,b. The switch 64 gates either of the two buses to a single bus 66 coupled to a memory interface 68. The memory interface 68 is coupled to the cache memory 70. Either blade 22a or 22b can thus communicate with the cache memory 70.

Referring to both FIGS. 2 and 3, it is noted that the bus 44 is not used in the NAS arrangement but is used in the SAN arrangement. Were the switches 38a,b not provided, the bus 40a,b would be coupled directly to the bus 44 for SAN functionality and thus would not be usable in the NAS arrangement. Through addition of the switches 38a,b, the bus 40a,b is useful in the NAS arrangement when the bus 44 is not in use, and is useful in the SAN arrangement during a blade failure. Note that the bus 44 and the buses 42a,b are not used at the same time, so full bus bandwidth is always maintained.

Figure 4:
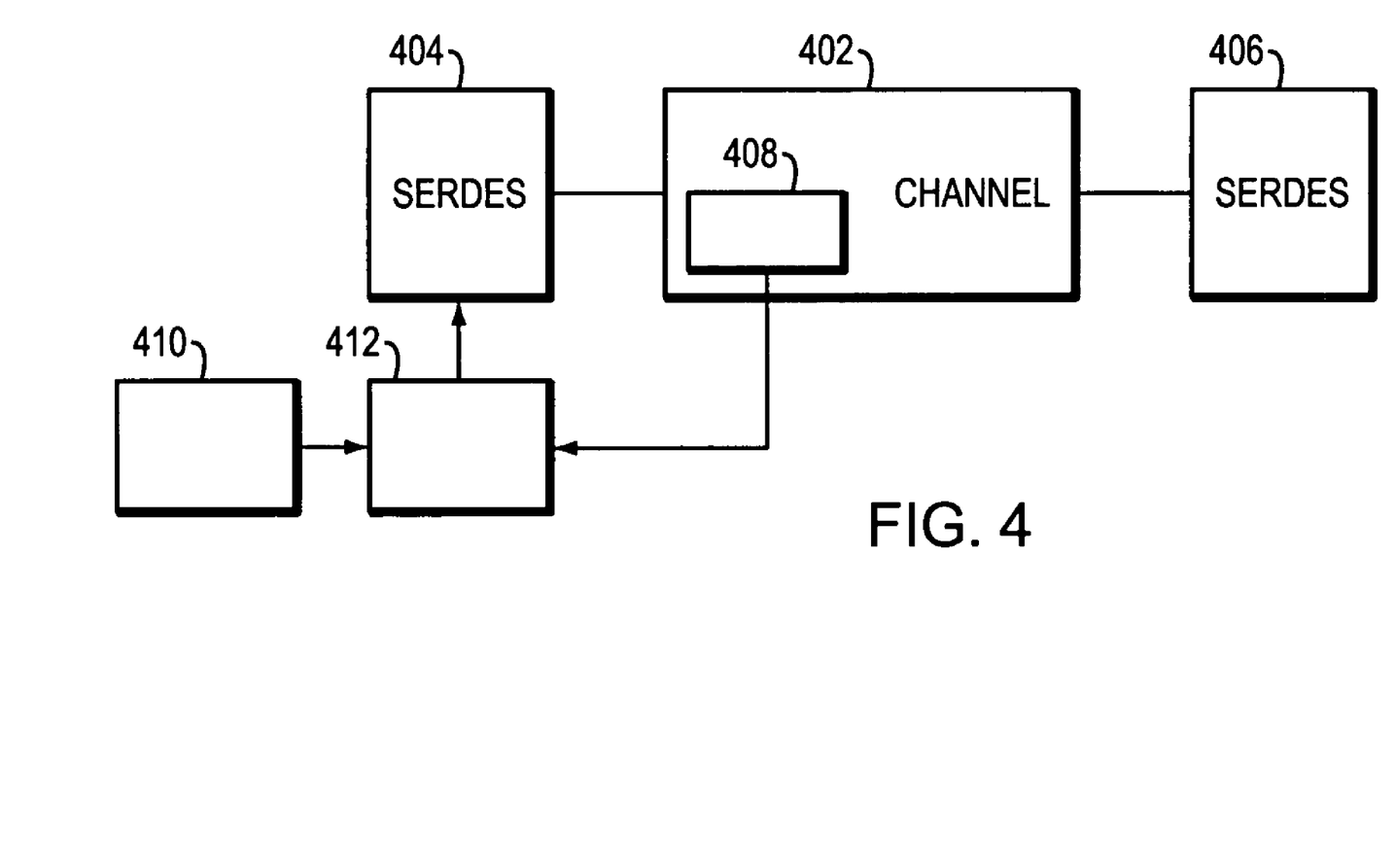
FIGS. 4 and 6 are illustrations of communications systems that may be used with the system of FIG. 1.

FIG. 4 illustrates a communications system that may be used in or by system 10 above, and/or may be used in or by a different system. For example, the system of FIG. 4 may be used to communicate between bus 40a or 40b (FIG. 2) and a storage enclosure of disk drives or between logic 48a or 48b (FIG. 2) and the storage enclosure.

In general, a technique is provided for establishing register settings in serial links based on hardware specific changes or characteristics in the system. Conventionally, a serial link contains a transmitter, a channel 402, and a receiver. Since the transmitter does not have control over channel characteristics, it is useful for the transmitter to be adaptable or configurable through settings. In particular, where the transmitter is part of functionality known as a serializer-deserializer (SERDES) 404, the transmitter can be adapted or configured based on register settings inside of the SERDES. Since a channel can be made up of different length cables or different receivers, or have other variables, there may be many combinations of register settings that need to be entered based on each of the three parts (transmitter, channel, receiver) of the serial link. Furthermore, the receiver may be part of another SERDES 406 and there may be register settings inside of the receiver to adjust to the serial link as well. Described herein are ways of managing these register settings based on changing channel/transmitter/receiver configurations.

In at least some implementations, a channel may have any of at least the following characteristics:
  Length from 0.001 inches to 20 meters or more.
  Multiple connectors or connections to jump from wire to wire.
  Different dielectric medias (e.g., air, FR4, ceramic)
  Speed rating from 1 Mhz to 10 Ghz or more A change in any one of these characteristics can cause a variance with respect to the optimal settings in or for a SERDES for a quality low bit error rate serial link. For example, if one wishes to run two inches on a serial link today and five meters on it tomorrow, the transmitter and receiver settings need to be adjusted accordingly to yield a low bit error rate on the serial link.

High performance depends on a low or zero bit error rate, i.e., on having little or no retries. Retries occur because of errors which happen as a result of an undesirable bit error rate ratio or low quality of the signal on the serial bit stream.

At least one example transmitter has the following registers for a minimal set of specifications:
  Voltage register (set from 100 mV to 1000 mV)
  Pre-emphasis register (set from 0 dB to 40 dB)
  Edge rate register
  PLL pole register
  PLL zero register At least one example receiver has the following registers for a minimal set of specifications:
  Equalization register (set from 0 dB to 40 dB)
  PLL pole register
  PLL zero register In at least some cases, best results are obtained with respect to characteristics and register settings by experimenting with values to establish and select preferred values and then assembling a policy matrix having the selected values in the matrix entries. The following example shows the varying of three different parameters (length, speed, and transmitter/receiver):

|  | Length = 2 Meter, speed = 2 G | Length = 5 Meter, speed = 2 G | Length = 2 Meter, speed = 4 G | Length = 5 Meter, speed = 4 G |
|---|---|---|---|---|
| Receiver 1, Transmitter 2 | | | | |
| Receiver 2, Transmitter 1 | | | | |

The example covers eight possible solutions for the three different parameters. In at least some cases, it is a time consuming and resource intensive process to fill out entries properly for setting all of the transmitter's and receiver's pertinent registers. For instance, if, in a typical case, either the receiver end or the transmitter end could power up first, it may be difficult on one end to determine the nature of the other end until the other end has powered up. In addition, since each instance of power up could change the other end, or the channel, it can be insufficient to use information from before the most recent instance of power up.

Accordingly, a deterministic process described below in connection with FIG. 4 is used by or for a SERDES, e.g., SERDES 404, for examining parameters and making appropriate adjustments. Hardware features that are relied on include the ability to read persistent memories such as serial ROMs 408, 410 of FIG. 4 that are accessible to at least one SERDES, e.g., by a side band communications method (e.g., I2C, RS232). A serial ROM may or may not be provided for each SERDES and for each channel. When there is no channel-related serial ROM accessible to the process, the process relies on the other SERDES to supply valuable information about the channel. When there is no serial ROM provided for the SERDES itself, its default settings are presumed to be correct until the other SERDES determines otherwise, and sends a new setting to it.

Figure 5:
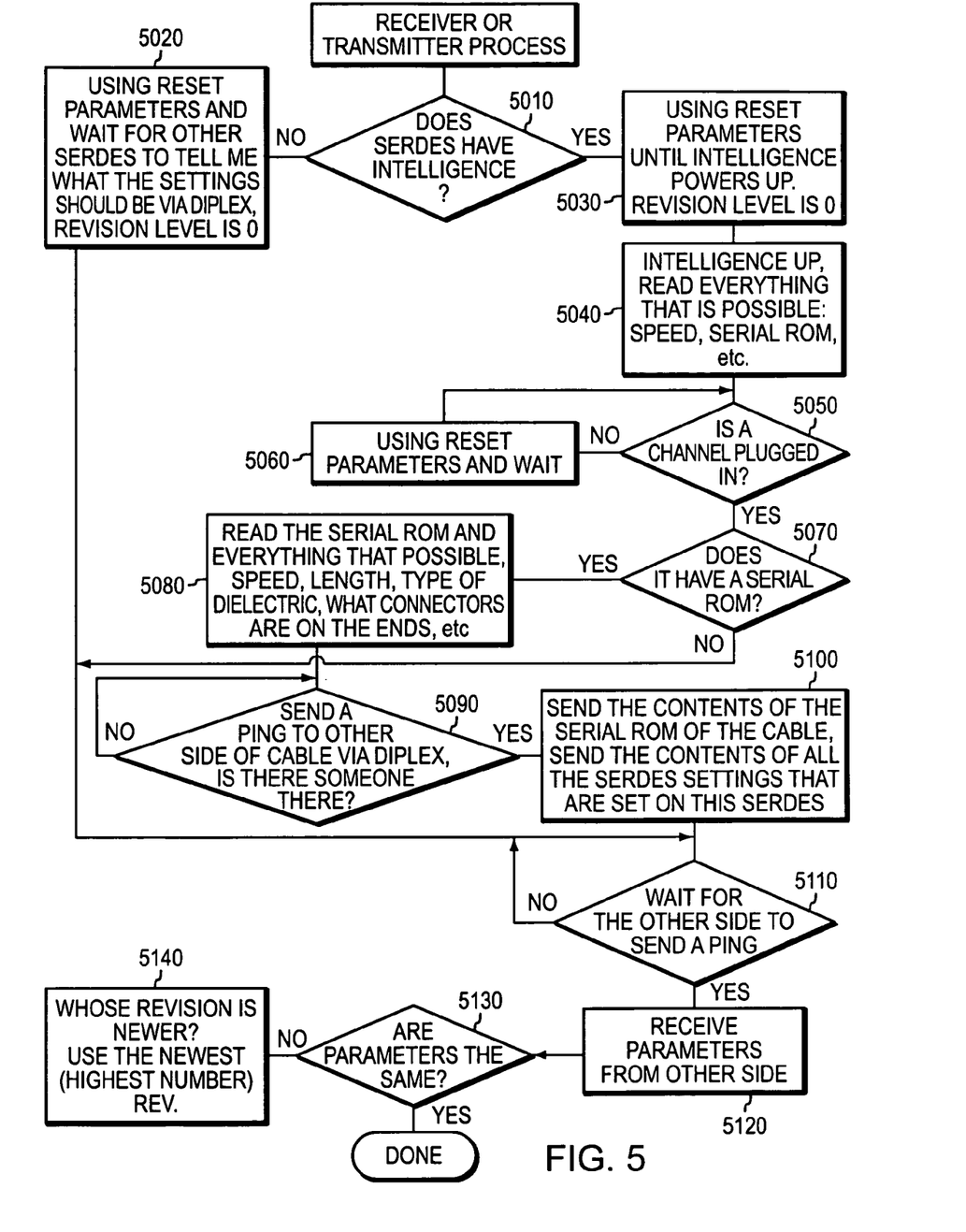
FIG. 5 is a flow diagram of a procedure for use with the system of FIG. 4.

With reference to FIGS. 4-5, it is first determined whether pertinent processing functionality 412 is available for the SERDES (step 5010). If not, reset parameters are to be used until the other SERDES 406 dictates settings (step 5020). Otherwise, reset parameters used until the processing functionality is ready (e.g., powered up) (step 5030). The processing functionality reads pertinent information from serial ROMs 408, 410 available to it (step 5040). If no channel is plugged in (step 5050), the reset parameters are used until the channel is plugged in (step 5060). If the channel does not have a serial ROM (step 5070), the reset parameters are used until the other SERDES dictates settings. Otherwise, the channel's serial ROM 408 is read (step 5080). If the other SERDES 406 is available for communication (step 5090), settings and other information are sent to the other SERDES (step 5100) and the process waits for a response (step 5110). The other SERDES returns proposed parameters for the SERDES (step 5120). If the proposed parameters are not the same (step 5130), the process uses the parameters associated with the newer revision of the process (step 5140).

Figure 6:
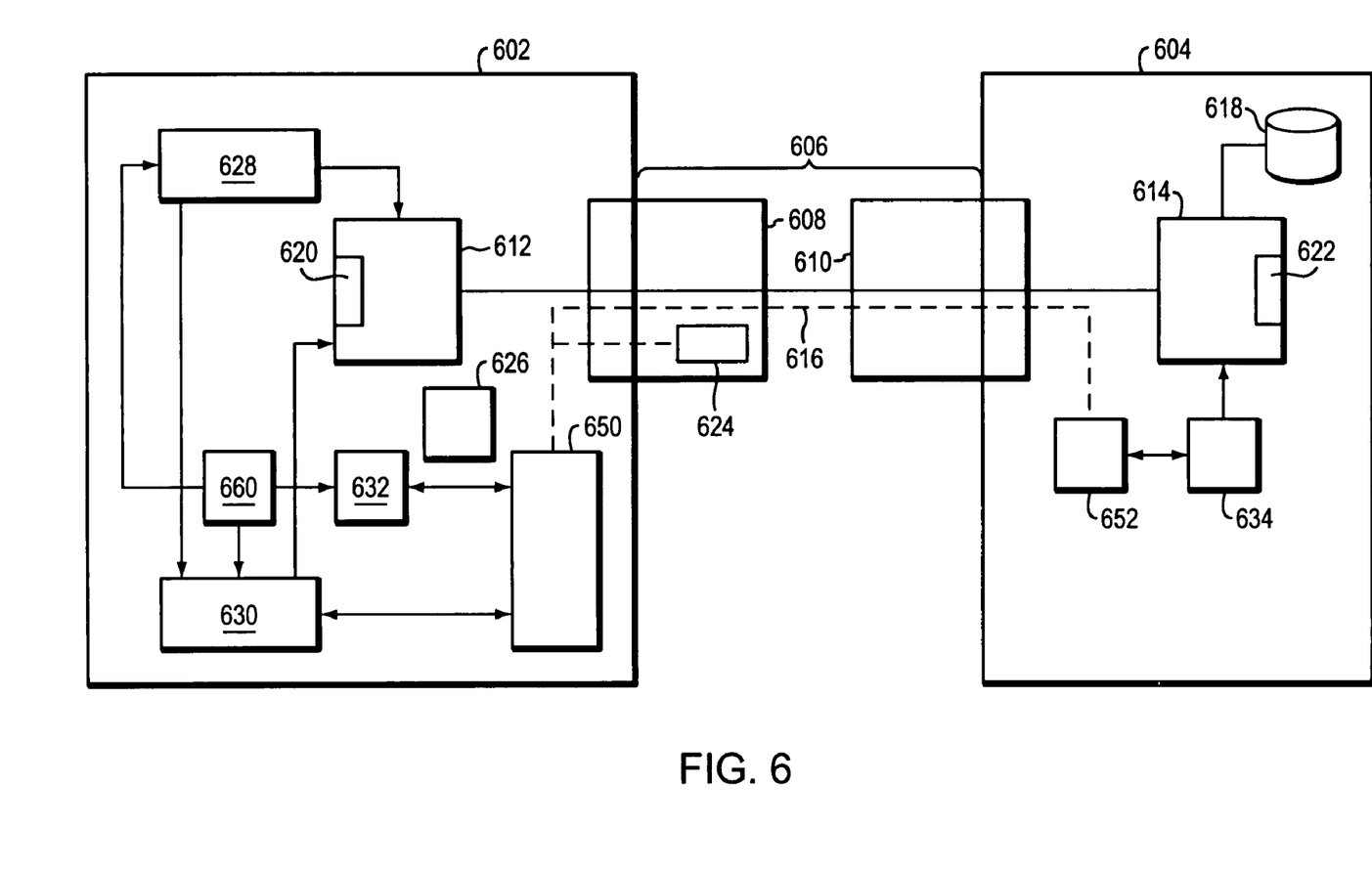

A particular system shown in FIG. 6 may use a specific version of the above-described tuning process, implemented using firmware and/or software components as described below.

Array 602 communicates with enclosure 604 using copper based cable 606 having connectors 608, 610 that allow SERDES 612 of the array to communicate with SERDES 614 of the enclosure. In a case in which array 602 is the same as or part of system 10 above, SERDES 612 may be driven by bus 40a or 40b, or may be at least part of logic 48a or 48b. SERDES 614 provides array 602 with access to disks 618 of the enclosure.

One reason that cable 606 is copper based instead of optical fiber based is that the specific tuning process relies, as described below, on out of band diplexing link 616 which is described in U.S. Pat. No. 5,901,151. As noted above, when driving high speed signals on the copper cable, it is useful to set SERDES 612, 614 properly.

In at least some implementations, cable 606 is or includes a Small Form-factor Pluggable (SFP) cable that has a serial ROM 624 that can be read to retrieve characteristic data as described below.

Link 616 does not rely on SERDES 612, 614 and normally is used by array 602 to communicate with array 604 to determine configuration information such as which enclosure is connected to which port on the array, the enclosure number, and information about the disks in the enclosure. Diplex driver circuits 650, 652 (e.g., including UARTs) are provided at ends of link 616.

Parameters that affect SERDES communications over cable 606 include the length of the cable, the identity of the array and the hardware type of the array (since the length of printed circuit board etch from SERDES 612 to connector 608 may need to be taken into account), the speed selected (e.g., 4 G), and the revision number of the SERDES. The parameters also include the type of cable, especially the type of connector on the other end. As described below, based on the parameters and one or more tables 660 of preselected values as illustrated by example in FIGS. 7A-7B, cable tuning values are written to registers 620 of SERDES 612.

Enclosure 604 also writes cable tuning values to registers 622 of SERDES 614. However, in at least one implementation, unlike the array, the enclosure does not have the same information available to determine values for registers 622, and may have the values dictated by the array over link 616 as described below. (Alternatively, the enclosure can receive a collection of basic parameter information from the array and self-determine the values. Under some circumstances, this would facilitate responding to changes resulting from the sparing of components on the array.)

With respect to determining characteristics, connector 608 has serial ROM 624 that indicates, among other things, the speed for which the cable is rated and the kind of connector 610. Array 602 has one or more serial ROMs 626 that identify the type of array 602 and other information. This information is needed in part because the specific tuning process cannot execute based on an assumption about the hardware in which it is executing.

In a specific implementation, the specific tuning process is caused to be executed by multiple functionalities and at multiple times after the array powers up, each of which functionalities relies on tables 660 described below. The functionalities include SERDES driver 628, configuration manager (CM) 630, and aforementioned POST 632 which includes a boot loader for loading the array's operating system from the enclosure.

Figure 7A:
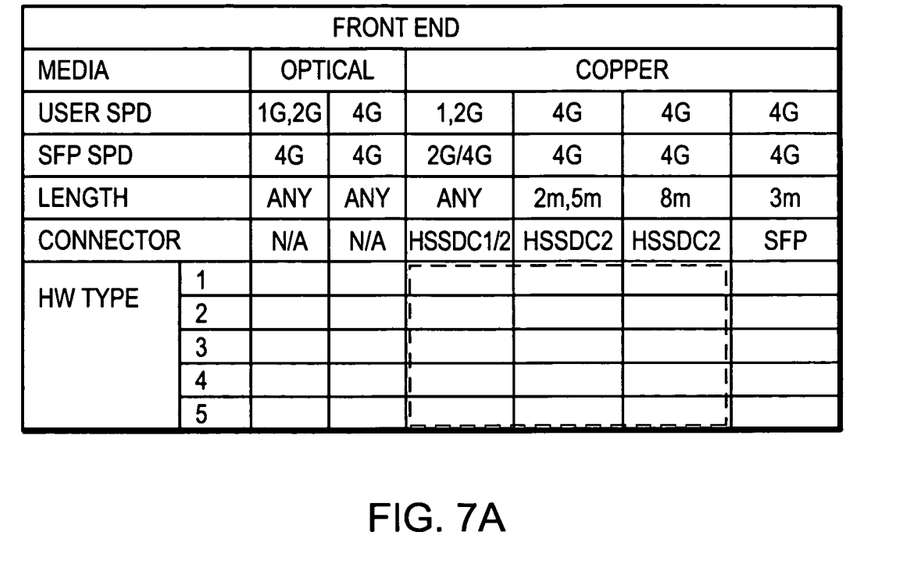
FIGS. 7A-7B are charts of information that may be used with the systems of FIGS. 4 and 6.
Figure 7B:
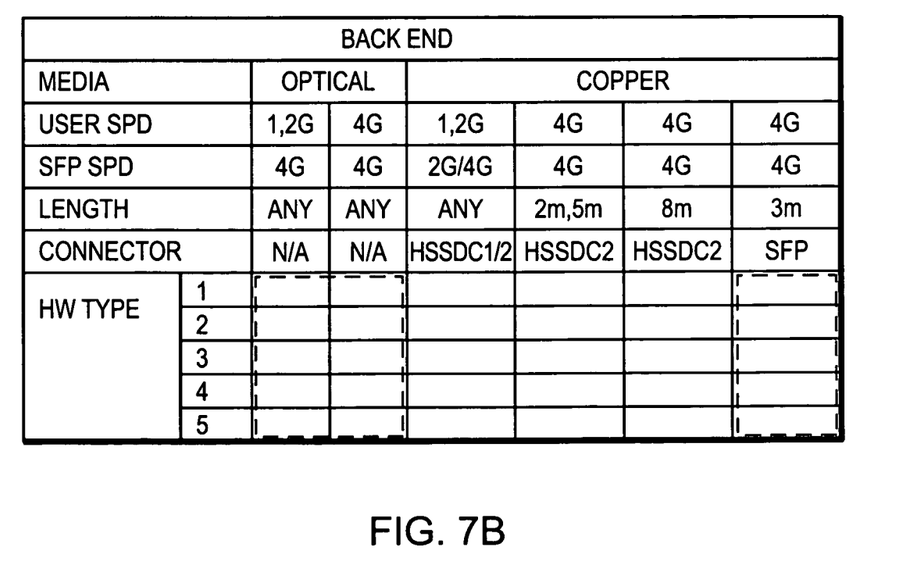

As shown in FIGS. 7A-7B, the tables include entries to cover error cases (also known as unsupported configurations and shown as darkened entries), such as a case in which a cable to a host computer (front end cable) is identified as a copper based cable or a case in which a cable to an enclosure (back end cable) is identified as an optical cable. In the tables of FIGS. 7A-7B, information specifying the cable media, cable speed (SFP Spd), cable length, and connector comes from ROM 624, the user speed specification (User Spd) comes from a user, FRUMON, or the system's registry, the hardware type (Hw Type) comes from POST, and whether the SERDES is for a back end connection or a front end connection comes from the Registry. Supported speeds include 1G, 2G, and 4G. Supported cable lengths include 2 meters, 3 meters, 5 meters, and 8 meters.

In at least one specific implementation with respect to the tables, the selected speed of communications is the most important factor in determining how the registers are written. In particular this is the case where it is deemed unnecessary to use values other than reset or default values for certain speeds.

POST executes the tuning process after power up so that it can use the SERDES to load the array's operating system from disks 618. (Since POST needs a working SERDES-SERDES link between the array and the enclosure to load the operating system, and POST runs before the SERDES driver is run, POST includes much of the SERDES driver functionality.)

Driver 628 executes the tuning process when initially loaded and then subsequently in response to any change in the SERDES-SERDES link between the array and the enclosure, such as the replacement of cable 606 or a change in speed settings.

CM executes the tuning process in response to changes mentioned above and is the functionality that communicates over diplexing link 616 to the enclosure to cause registers 622 to be updated if necessary. Initially, in general, CM communicates over link 616 with enclosure functionality 634 referred to as FRUMON to determine extensive information about the enclosure including its speed, which information is used within the array to manage interactions between the array and the enclosure.

Depending on the implementation, since POST runs before CM is running, POST's execution of the tuning process may or may not include communicating settings for enclosure SERDES registers. In the latter case, POST may simply drive array SERDES registers 620 to settings expected to make SERDES 612 work adequately enough with the enclosure to load the operating system.

In general, a SERDES-SERDES link over cable 606 should be tuned well enough so that errors that can be successfully overcome by retries (soft errors) are nearly non-existent in steady-state operation, because such errors adversely impact performance. However, soft errors may be tolerated at other times, e.g., on power up before the link is fully tuned, in order to allow the operating system to be loaded.

In at least one implementation, even if a soft error prone SERDES-SERDES link is available, all communication between the array and the enclosure's FRUMON functionality takes place over link 616 because the FRUMON functionality is not configured to communicate via the SERDES-SERDES link, which has as its main purpose facilitating high speed data traffic between the array and drives 618.

After steady state interaction between the array and the enclosure has been established, the specific tuning process may be executed again in response to any of various triggering events, including unplugging a cable and plugging in the same or a different cable. The unplugging disconnects both the SERDES-SERDES link and link 616, and therefore may be detected by both the SERDES driver and CM, and may lead both to execute the specific tuning process, or may lead the SERDES driver to direct CM to so execute. Other triggering events may include changes with respect to boards in the array or the enclosure, or drive changes. The events may be detected by polling, or by interrupt.

In general, the specific tuning process may be used for a SERDES-SERDES link of any speed. However, in at least one implementation, all or part of the process may be reserved for use only in the event the array and the enclosure are set to communicate at a particular speed (e.g., 4 G), or at any speed above a particular speed. At lower speeds, the specific tuning process may technically provide a signal integrity benefit but may not necessarily provide a practical benefit that is visible in terms of a lower bit error rate or fewer soft errors.

In a specific implementation, SERDES 612 and/or SERDES 614 may be or include a Tachyon QX4 (PMC-Sierra HPFC-6400 Series product), which is a high-performance 4-port 4 G Fibre Channel controller. In a specific implementation, SERDES 612 and/or SERDES 614 may be or include a PMC-Sierra PM8379 CTS 20×4G 20-Port 4.25 G FC-AL cut-through switch. The values used to program registers 620 and/or 622 may be or include internal transmitter/receiver (iTR) values.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, all or a portion of the techniques described above may be used in connection with any suitable communications protocol, including the following protocols and/or protocols based on the following protocols: new Fibre Channel protocols, Rapid IO, 1394 Firewire, USB, SAS, SATA, and/or PCI Express.

We claim:

1. A method for use in managing communications settings, comprising:
    following a triggering event, using hardware features to determine system characteristics that affect communications on a high speed transmission link between nodes, the system characteristics including system hardware information and physical characteristics of a cable;
    deriving tuning information from the system characteristics; and
    communicating at least some of the tuning information between the nodes.

2. The method of claim 1, further comprising:
    using the tuning information to configure a transmitter in one of the nodes and a receiver in another one of the nodes prior to establishing steady state data transfer between the nodes.

3. The method of claim 1, wherein at one of the nodes allows communication into a data storage enclosure.

4. The method of claim 1, wherein at least one of the nodes comprises a serializer-deserializer (SERDES).

5. The method of claim 1, wherein the system characteristics include cable length.

6. The method of claim 1, wherein the system characteristics include receiver type.

7. The method of claim 1, further comprising:
    applying the tuning information to register settings in at least one of the nodes.

8. The method of claim 1, further comprising:
    applying the tuning information to registers based on cable length and speed.

9. The method of claim 1, further comprising:
    applying the tuning information to registers based on media dielectric and connector.

10. The method of claim 1, further comprising:
    applying the tuning information to registers based on media dielectric and connector.

11. The method of claim 1, further comprising:
    applying the tuning information to set at least one of the following registers: Voltage register, Pre-emphasis register, Edge rate register, PLL pole register, and PLL zero register.

12. The method of claim 1, further comprising:
    applying the tuning information to set at least one of the following registers: Equalization register, PLL pole register, and PLL zero register.

13. The method of claim 1, further comprising:
    applying the tuning information based on a policy matrix.

14. The method of claim 1, further comprising:
    relying on the tuning information in the absence of serial ROM information.

15. The method of claim 1, further comprising:
    reading characteristic information about the cable from a memory device associated with the cable.

16. The method of claim 1, further comprising:
    using out of band signalling to communicate tuning information between the nodes.

17. The method of claim 1, further comprising:
    deriving the tuning information in response to a change in the high speed transmission link.

18. A system for use in managing communications settings, comprising:
    following a triggering event, determination logic using hardware features to determine system characteristics that affect communications on a high speed transmission link between nodes, the system characteristics including system hardware information and physical characteristics of a cable;
    derivation logic deriving tuning information from the system characteristics; and
    communication logic communicating at least some of the tuning information between the nodes.

* * * * *